United States Patent [19]

Buss et al.

[11] 3,718,578
[45] Feb. 27, 1973

[54] REFORMING WITH A PLATINUM-TIN-IRIDIUM CATALYST

[75] Inventors: Waldeen C. Buss, Richmond; Harris E. Kluksdahl, San Rafael, both of Calif.

[73] Assignee: Chevron Research Company, San Francisco, Calif.

[22] Filed: Feb. 20, 1970

[21] Appl. No.: 13,044

[52] U.S. Cl. ................................208/139, 252/466 PT
[51] Int. Cl. ..............................................C10g 35/08
[58] Field of Search .........252/466 PA; 208/138, 139

[56] References Cited

UNITED STATES PATENTS

| 2,848,377 | 8/1958 | Webb | 252/466 |
| 2,861,959 | 11/1958 | Thorn et al. | 252/465 |
| 2,952,611 | 9/1960 | Haxton et al. | 208/139 |
| 3,507,781 | 4/1970 | Spurlock et al. | 208/138 |
| 3,511,888 | 5/1970 | Jenkins | 260/673.5 |
| 3,531,543 | 9/1970 | Clippinger et al. | 252/466 |
| 3,554,902 | 1/1971 | Buss | 208/139 |

Primary Examiner—Herbert Levine
Attorney—J. A. Buchanan, Jr., G F. Magdeburger, R. H. Davies and T. G. DeJonghe

[57] ABSTRACT

Reforming a naphtha in the presence of hydrogen with a catalyst composition comprising a porous solid carrier, 0.01 to 3 weight percent platinum, 0.01 to 5 weight percent tin; and 0.001 to 1 weight percent iridium; also the novel supported platinum-tin-iridium catalyst.

5 Claims, 4 Drawing Figures

INVENTORS
WALDEEN C. BUSS
HARRIS E. KLUKSDAHL

BY
ATTORNEYS

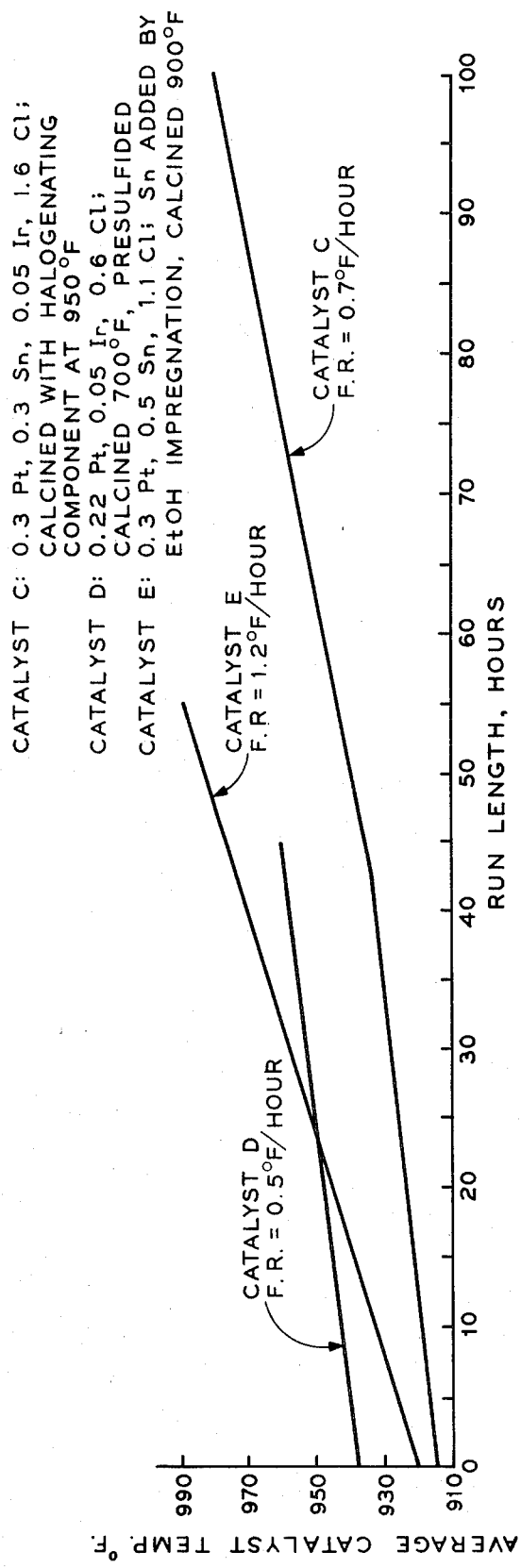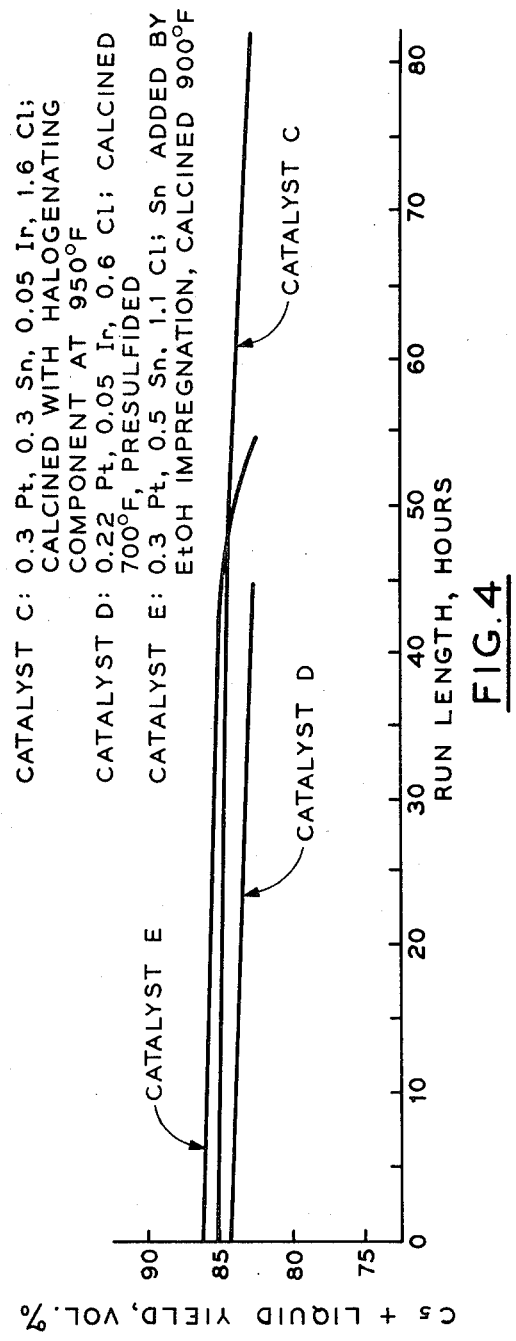

REFORMING WITH A PLATINUM-TIN-IRIDIUM CATALYST

BACKGROUND

This invention relates to hydrocarbon reforming processes and more particularly to catalytic reforming of a naphtha fraction in the presence of a novel catalyst comprising a porous solid carrier, platinum, tin, and iridium. The catalyst comprises 0.01 to 3 weight percent platinum, 0.01 to 5 weight percent tin, 0.001 to 1 weight percent iridium, and a porous solid carrier.

Catalytic reforming is well known in the petroleum industry and refers to the treatment of naphtha feedstocks to improve the octane rating, primarily through increasing the aromatic content thereof, for example by dehydrogenating naphthenes to aromatics, dehydrocyclizing paraffins to naphthenes and aromatics, and the like. Catalysts for successful reforming processes should possess good selectivity, that is, be able to produce high yields of high octane number gasoline products and, accordingly, low yields of light gaseous hydrocarbons or carbonaceous by-products. In addition, it is very desirable that the catalysts exhibit good yield stability; that is, the yield of $C_5+$ gasoline product of a certain octane number should not decrease appreciably during a prolonged period of reforming. Decreases in $C_5+$ liquid yield of only a few percent during the process represent a substantial economic loss. Another characteristic of good reforming catalysts is a low fouling rate; that is, the rate of increase in temperature necessary to maintain conversion of the feed to constant octane number gasoline product should be relatively low. Rapid fouling of the catalyst requires early shutdown of the reforming process and subsequent regeneration of the catalyst.

Catalysts comprising platinum, for example, platinum supported on alumina, are well known and for a long time widely used for the reforming of naphthas and gasoline boiling range materials in order to produce high octane gasolines. Catalysts containing platinum and rhenium were discovered by one of the present applicants to be superior to platinum catalysts for reforming, as described in U.S. Pat. No. 3,415,737. However, both platinum and rhenium are in restricted supply and are very expensive.

Application, Ser. No. 753,165, filed Aug. 16, 1968, now U.S. Pat. No. 3,554,902 by one of us is directed to a reforming process using a catalyst composition comprising platinum and iridium in association with a carrier, for example, alumina, and maintaining less than about 15 ppm sulfur in the reaction zone. The platinum-iridium catalytic composition has a remarkably low fouling rate compared to a catalyst comprising platinum without iridium.

In application, Ser. No. 865,010, filed Oct. 9, 1969, now abandoned by one of us, a catalyst composition comprising platinum and tin in association with a carrier is disclosed as exhibiting a remarkably low fouling rate as compared to a catalyst comprising platinum without tin in association with a carrier. The platinum-tin catalyst also has yield stability better than that of a platinum catalyst without tin.

SUMMARY OF THE INVENTION

It has now been discovered that catalyst compositions comprising platinum, tin, and iridium, that is, from 0.01 to 3.0 weight percent platinum, and 0.01 to 5 weight percent tin, and 0.001 to 1 weight percent iridium, included with a porous solid carrier, result in a catalyst having unexpectedly high yield stability and low fouling rate.

The process of the present invention comprises contacting a naphtha fraction and hydrogen at reforming conditions with a catalyst composition including a porous solid carrier, 0.01 to 3 weight percent platinum, 0.01 to 5 weight percent tin, and 0.001 to 1 weight percent iridium. Preferably the porous solid carrier is an inorganic oxide, more preferably alumina.

Furthermore, the present invention comprises the novel catalytic composition including a porous solid carrier, 0.01 to 3 weight percent platinum, 0.01 to 5 weight percent tin, and 0.001 to 1 weight percent iridium.

DESCRIPTION OF THE DRAWING

The present invention can be better understood and will be further explained hereinafter with reference to the graphs in FIGS. 1–4 which compare in simulated life tests the platinum-iridium-tin catalysts of the present invention with platinum catalyst, platinum-iridium catalyst and platinum-tin catalyst, all as described more fully in the examples.

FIG. 3 illustrates that the platinum-tin-iridium catalyst has a lower fouling rate than platinum-tin catalyst.

FIG. 4 illustrates that the platinum-tin-iridium catalyst exhibits good yield stability for a longer period of time than either platinum-iridium catalyst or platinum-tin catalyst.

DESCRIPTION OF THE INVENTION

The Catalytic Composition

Figure 1:
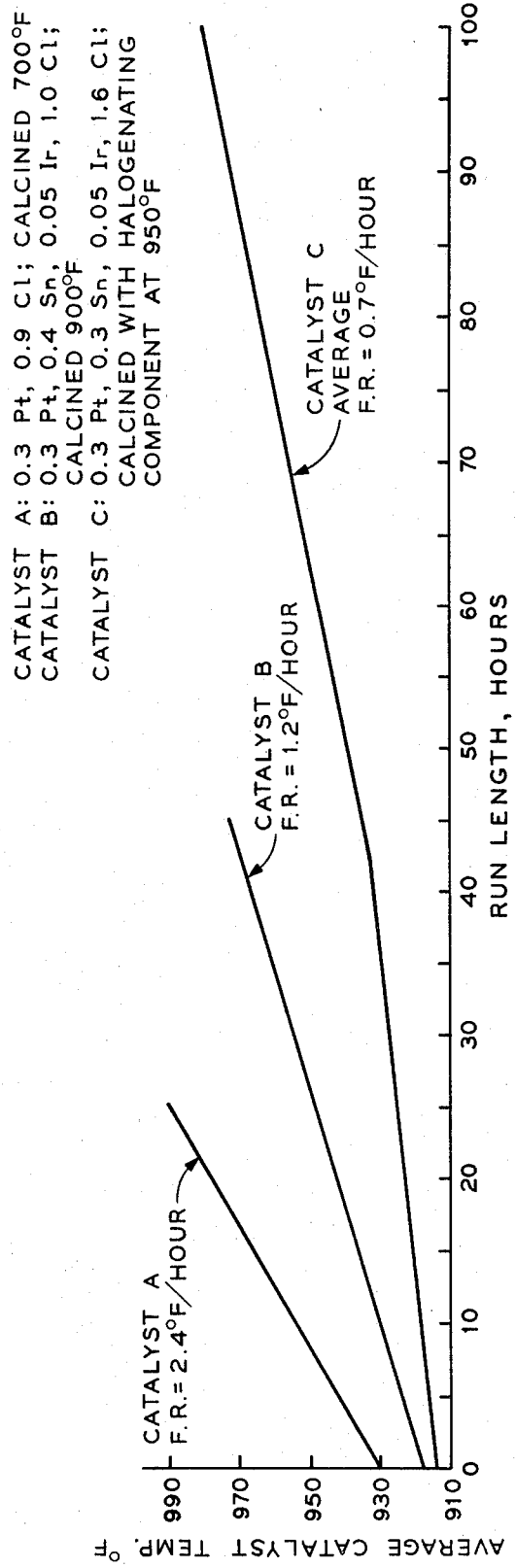
FIG. 1 illustrates that the platinum-tin-iridium catalyst fouls at a much lower rate than platinum catalyst without tin and iridium. Also the platinum-tin-iridium catalyst calcined in the presence of a halogenating component has a considerably lower fouling rate than the platinum catalyst without tin and iridium and than the platinum-tin-iridium catalyst calcined without a halogenating component.

The porous solid carrier or support that is employed in the preparation of the catalytic composition of the present invention includes a large number of materials with which catalytically active amounts of platinum, tin, and iridium can be associated. The porous solid carrier can be, for example, charcoal or carbon. A high surface area inorganic oxide carrier is particularly preferred, e.g., an inorganic oxide having a surface area of from 50 m²/gm. to 700 m²/gm. The carrier can be a natural or a synthetically-produced inorganic oxide or combination of inorganic oxides. Reforming processes are preferably conducted in the presence of catalysts having low cracking activity, i.e., catalysts of limited acidity. Hence, preferred carriers are inorganic oxides such as magnesia and alumina, particularly high purity alumina. However, in some instances acidic inorganic oxide supports such as naturally occurring aluminum silicates and the synthetically-produced cracking supports, including silica-alumina, silica-zirconia, silica-alumina-zirconia, silica-magnesia, silica-alumina-magnesia, and crystalline zeolitic aluminosilicates can be used.

A particularly preferred catalytic carrier or support for purposes of this invention is alumina. Any of the forms of alumina suitable as a carrier for reforming catalysts can be used. Furthermore, alumina can be prepared by a variety of methods satisfactory for the purposes of this invention. The preparation of alumina for use in reforming catalysts is well known in the prior art. Thus, the alumina may be prepared as alumina hydrosol, alumina hydrogel, alumina zerogel, alumina monohydrate, and the like.

The catalytic composition includes a porous solid carrier, and catalytically active amounts of platinum, tin, and iridium preferably in intimate admixture. The catalyst proposed for use in the present invention comprises platinum in amounts of from 0.01 to 3 weight percent and more preferably from 0.1 to 1.0 weight percent based on the finished catalyst. The tin concentration in the finished catalyst composition is from 0.01 to 5 weight percent, preferably from 0.01 to 3 weight percent, and more preferably from 0.1 to 1.0 weight percent. The concentration of iridium in the final composition is from 0.001 to 1 weight percent, preferably from 0.01 to 0.3 weight percent. The platinum, tin, and iridium may exist as metals or as compounds on the finished catalyst. Reference to "platinum", "tin", and "iridium" is meant to include the metallic form as well as the compound form, e.g., the sulfide, halide, or oxide form. The weight percent of the platinum, tin, and iridium is calculated on the basis of the metal.

Although the components platinum, tin, and iridium can be included with the porous solid carrier by any suitable technique such as ion-exchange, coprecipitation, etc., the components are usually and preferably included with the porous solid carrier by impregnation. One of the components can be included with the carrier by one procedure, e.g., ion exchange, and the other components included with the carrier by another procedure, e.g., impregnation. The catalyst can be prepared either by coimpregnation of the three components or by sequential impregnation. In general, the carrier material is impregnated with a solution of a decomposable compound of the metal in sufficient concentration to provide the desired quantity of metal in the finished catalyst; the resulting mixture is then heated to remove solvent. Chloroplatinic acid in an aqueous solution is generally the preferred source of platinum. Other feasible platinum-containing compounds, e.g., ammonium chloroplatinates and polyammine platinum salts, can also be used. Iridium compounds suitable for including with the carrier include, among others, chloroiridic acid, iridium tribromide, ammonium chloroiridate, iridium trichloride, and ammonium bromoiridate. Tin compounds suitable for including onto the carrier include stannous chloride, stannic chloride, other tin halides, organic tin derivatives, and other tin containing salts.

The tin component is preferably associated with the porous solid carrier suitably by impregnation. Impregnation can be accomplished using an aqueous solution of a suitable compound. When using an aqueous tin impregnating procedure, it may be desirable to activate the resulting catalytic composition of matter so that it will exhibit optimum catalytic activity. The preferred activation process comprises reacting the catalytic composition with an activating gas including oxygen at a temperature from 500° to 1300°F. for at least about 0.5 hour. The activating gas may be slightly moist. The activating gas preferably includes a halogenating component and if it includes a halogenating component it is preferably slightly moist.

As another embodiment, the tin component is impregnated on the carrier from an organic solution. Thus, a tin compound dissolved in ether or alcohol or other suitable organic solvent may be used as the impregnation solution. Care should be exercised after impregnation that the organic material is completely evaporated or removed from the catalyst prior to heating of the catalyst in the presence of a reducing atmosphere, for example, hydrogen. Thus, careful drying or calcination should follow impregnation using an organic solvent in order to thoroughly rid the catalyst of hydrocarbon molecules. The presence of hydrocarbons on the catalyst during contact with a hydrogen atmosphere appears to detrimentally affect the performance of the catalyst during hydroconversion reactions as, for example, reforming. The organic solution is preferably substantially anhydrous. If it is not substantially anhydrous, then the catalytic composition should preferably be activated as described above so that it has substantially optimum activity. In general, if the catalytic composition is contacted with a substantial amount of moisture during or after impregnation with a tin component, it is desirable to activate the composition by the disclosed process so that it will have substantially optimum activity.

It is contemplated in the present invention that including of the components platinum, tin, and iridium, with the carrier can be accomplished at any particular stage of the catalyst preparation. For example, if the components are to be associated with an alumina support, the including may take place while the alumina is in the sol or gel form followed by precipitation of the alumina. Alternatively, a previously prepared alumina carrier can be impregnated with a solution of the metal compounds. Also, comminuted alumina may be impregnated with a solution of the metal compounds, prior to or during pasting or extrusion of the alumina to form solid support particles.

Following dispersion on the carrier material of the platinum, tin, and iridium, the resulting composition is usually dried by heating at a temperature of, for example, no greater than about 500°F. and preferably at about 200°F. to 400°F. Thereafter the composition can be calcined in an oxygen-containing atmosphere, e.g., air, at an elevated temperature, e.g., up to about 1300°F., if desired. It may be desirable to include one or two components, for example, platinum and/or iridium, with the carrier, followed by drying and calcination, before including the other component or components.

The carrier containing 0.01 to 3 weight percent platinum, 0.01 to 5 weight percent tin, and 0.001 to 1 weight percent iridium is preferably heated at an elevated temperature in a hydrogen-containing atmosphere. Preferably the heating is performed in the presence of a substantially hydrocarbon-free, hydrogen containing gas that is also substantially free of catalyst deactivating gases such as carbon oxides and water. More preferably, the gas is substantially dry hydrogen. In particular, it is preferred that this heating is accomplished at a temperature in the range of 600° to 1300°F. and preferably 600° to 1000°F.

The catalyst can be promoted for reforming by the inclusion of combined halogens (halides), particularly fluorine or chlorine. Bromine is also useful for promoting the catalyst for reforming. The halogens apparently provide a limited amount of acidity to the catalyst which is beneficial to most reforming operations. A catalyst promoted with halogen preferably contains from 0.1 to 3 weight percent halogen. When the halogen is chlorine it is preferably present from 0.3 to 2.0 weight percent, total chlorine content. The halogen can be included with the catalyst carrier at any suitable stage of catalyst manufacture, e.g., prior to or following inclusion of the platinum, iridium, or tin. Some halogen is often included with the carrier when impregnating with the metal components; for example, impregnation with chloroplatinic acid normally results in chlorine inclusion with the carrier. Additional halogen may be included with the support simultaneously with inclusion of the metal component if so desired. If the catalyst is activated, as previously described, some halogen can be incorporated during the activation. Halogen can also be included with the catalyst during startup and/or reforming. Including of halogen can be accomplished by passing a gas containing a halogenating component, for example, carbon tetrachloride, chloroform, and the like, in contact with the catalyst at a temperature sufficient to cause reaction, e.g., 600°–1300°F. The halogen content of the catalyst can be adjusted during the reforming by adding a halogenating component to the reaction zone with the feed, hydrogen, or feed-hydrogen mixture. In general, the halogen is included with the catalyst carrier by contacting suitable compounds such as hydrogen fluoride, ammonium fluoride, hydrogen chloride, or ammonium chloride, either in the gaseous form or in a water soluble form, with the carrier. Preferably, at least a portion of the halogen is included with the carrier from an aqueous solution containing the halogen.

The catalyst can be sulfided prior to contact with the feed in the reaction zone. Sulfiding the catalyst prior to contact with the naphtha helps reduce the production of light hydrocarbon gases during startup. The presulfiding can be done in situ or ex situ by passing a sulfur-containing gas, for example, $H_2S$, in the presence of hydrogen, over the catalyst. Other presulfiding treatments are known in the prior art. Also, it has been found that on startup a small amount of sulfur, for example, $H_2S$ or dimethyldisulfide, added to the reforming zone with the feed, may help to reduce the initial hydrocracking activity of the catalyst. The sulfur can be introduced in any convenient manner and at any convenient location. It can be contained in the liquid hydrocarbon feed, the hydrogen-rich gas, a recycle liquid stream, or a recycle gas stream or any combination. Generally, during the reforming process most sulfur contained on the catalyst is stripped from the catalyst and will thus be removed from the reaction zone.

Feedstock

The feedstock to be employed in the reforming operation is a light hydrocarbon oil, for example, a naphtha fraction, i.e., a mixture of aromatic, paraffinic, and naphthenic hydrocarbons. Generally, the naphtha will boil in the range falling within the limits of from 70° to 550° and preferably 150° to 450°F. The feedstock can be a straight-run naphtha, a thermally or catalytically cracked naphtha, a hydrocracked naphtha, or blends or fractions thereof. Preferably the feed should be substantially free of sulfur, that is, the feed should preferably contain less than about 10 ppm sulfur, more preferably less than 5 ppm sulfur, and still more preferably less than 1 ppm sulfur. The sulfur content is determined as weight of sulfur to weight of feed. At higher sulfur contents the platinum-tin-iridium catalyst fouls more rapidly. The sulfur content of the feed during reforming can exceed the preferred limits for considerable periods of time without permanently harming the catalyst. That is, although the fouling rate of the catalyst will be increased while the feed is higher in sulfur content than preferred, the fouling rate will become low once again when the sulfur content of the feed is reduced to the preferred levels.

In the case of a feedstock which is not already low in sulfur, lower levels can be reached by hydrogenating the feedstock in a presaturation zone where the naphtha is contacted with a hydrogenation catalyst which is resistant to sulfur poisoning. A suitable catalyst for this hydrodesulfurization process is, for example, an alumina-containing support with a minor proportion of molybdenum oxide and cobalt oxide. Hydrodesulfurization is ordinarily conducted at a temperature from 700° to 850°F., a pressure from 200 psig to 2000 psig, and a liquid hourly space velocity from 1 to 5. The sulfur contained in the naphtha is converted to hydrogen sulfide which can be removed prior to reforming by suitable conventional processes.

It is preferred that the feedstock be substantially free of moisture, that is, the feedstock should preferably contain less than about 50 ppm water, more preferably less than 15 ppm water, by weight. This serves to keep the activity of the catalyst high for longer periods of time.

In the case of a reforming process wherein the effluent is separated into reformed gasoline product and hydrogen-rich gas and the hydrogen-rich gas is recycled to the reforming zone, it may be desirable to pass the hydrogen-rich gas in contact with an absorption zone, for example, a molecular sieve, to remove sulfur from the recycle stream. Also the absorption zone will remove water from the recycle stream. The recycle stream, after removal of water therefrom, preferably contains no more than about 100 ppm by weight water and more preferably no more than about 50 ppm by weight water. Thus, the concentration of impurities, for example, sulfur and water, will not be permitted to build up to significant amounts in the recycle stream. However, it is understood that it is not essential that the sulfur be scrubbed from the recycle stream.

Reforming Conditions

The reforming conditions used in the present invention will depend in large measure on the feed used, whether highly aromatic, paraffinic, or naphthenic, and upon the desired octane rating of the product. The temperature in the reforming operation will generally be in the range of about 500° to 1300°F. and preferably about 700° to 1050°F. The pressure in the reforming reaction will in general lie within the range from about 25 psig to 1000 psig and preferably from about 50 psig to 750 psig. The temperature and pressure can be correlated with the liquid hourly space velocity (LHSV) to favor any particularly desirable reforming reaction as, for example, aromatization or isomerization or dehydrogenation. In general, the liquid hourly space velocity will be from 0.1 to 20 and preferably from 1 to 10.

Reforming of a naphtha is accomplished by contacting the naphtha at reforming conditions and in the presence of hydrogen with the desired catalyst. Reforming results in the production of hydrogen. The hydrogen produced during the reforming process is generally recovered from the reaction products, and, preferably, at least part of said hydrogen is recycled to the reaction zone. Thus, excess hydrogen need not necessarily be added to the reforming system. However, it is usually preferred to introduce excess hydrogen at some stage during the operation as, for example, during startup. The hydrogen can be introduced into the feed prior to contact with the catalyst or can be contacted simultaneously with the introduction of the feed to the reaction zone. Generally, the hydrogen is recirculated over the catalyst prior to contact of the feed with the catalyst. The presence of hydrogen serves to reduce the formation of coke which tends to poison the catalyst. Moreover, the presence of hydrogen can be used to favor certain reforming reactions, e.g., isomerization, or hydrocracking. Hydrogen is preferably introduced into the reforming reactor at a rate in the range from about 0.5 moles to about 20 moles of hydrogen per mole of feed. The hydrogen can be in admixture with light gaseous hydrocarbons.

Regeneration

After a period of operation when the catalyst becomes deactivated by the presence of carbonaceous deposits, the catalyst can be regenerated by passing an oxygen-containing gas, such as air diluted with an inert gas to contain no more than about 2 percent oxygen, into contact with the catalyst at an elevated temperature in order to burn carbonaceous deposits from the catalyst. The method of regenerating the catalyst will depend on whether there is a fixed bed, moving bed, or fluidized bed operation. Regeneration methods and conditions well known in the art can be used.

It may also be desirable to activate the catalyst after it is regenerated. This may be accomplished in precisely the manner previously disclosed for activating a fresh platinum-tin-iridium catalyst wherein the tin has been included with the catalyst by impregnation with an aqueous solution. The use of a halogenating component included with the activating gas is generally attractive when activating a deactivated catalyst since the catalyst may have lost some halogen during its use in a reforming process. Halogen analysis of the catalyst can be performed to determine whether a halogenating component should be included with the activating gas.

After regeneration, or regeneration and activation if the catalyst is activated, the catalyst is preferably heated at an elevated temperature in a hydrogen containing atmosphere. Preferably, the heating is performed in the presence of a substantially hydrocarbon-free, hydrogen containing gas that is preferably substantially dry and substantially free of catalyst deactivating gases such as carbon oxides at a temperature from 600° to 1300°F., and more preferably from 600° to 1000°F.

The process of the present invention will be more readily understood by reference to the following Examples. The Examples are illustrative only and the invention, of course, is not to be limited thereto.

EXAMPLE 1

Catalysts A, B and C were each individually used in reforming a hydrofined catalytically cracked naphtha under accelerated reforming conditions. Catalyst A comprised 0.3 weight percent platinum and 0.9 weight percent chlorine. It had been calcined at 700°F. percent iridium, and B comprised 0.3 weight percent platinum, 0.4 weight percent tin, 0.05 weight percent iridium, and 1.0 weight percent chlorine. It had been calcined at 900°F. The chlorine had been added by impregnation prior to calcining. Catalyst C comprised 0.3 weight percent platinum, 0.3 weight percent tin, 0.05 weight percent iridium, and 1.6 weight percent chlorine. It had been calcined and activated in the presence of a halogenating component at 950°F. The activating gas had about 0.3 percent moisture. A portion of the 1.6 weight percent chlorine was introduced in this manner. The calcining had in each case been performed in the presence of about 5 percent oxygen. The processes were conducted at reforming conditions including an average reactor pressure of 160 psig, a hydrogen to hydrocarbon mole ratio of 4, and a liquid hourly space velocity of 4. The temperature of the catalyst, in the process using each catalyst, was adjusted throughout each run to maintain production of a 99 F–1 clear octane product. The runs were made using once-through hydrogen. The hydrofined, catalytically cracked naphtha had an initial boiling point of 151°F., an end boiling point of 428°F., and a 50 percent boiling point of 307°F. The Research octane number of the feed was 64.6 F–1 clear. The naphtha contained less than 0.1 ppm nitrogen and less than 0.1 ppm sulfur. The feed was specifically chosen because of its severe deactivating effect on reforming catalysts. Using this feed and the above reaction conditions, the tests of reforming catalysts are accelerated, i.e., performed in a fraction of the time needed with a less severely deactivating feed and under less severe conditions.

Figure 2:
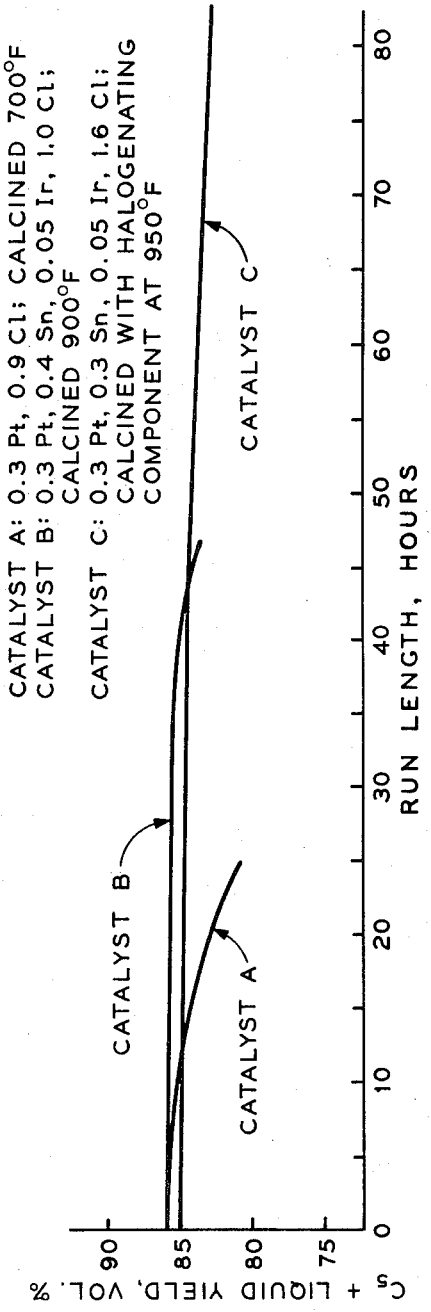
FIG. 2 illustrates that the processes using platinum-tin-iridium catalysts exhibit better yield stability when producing 99 F-1 clear octane product than the process using platinum catalyst without tin and iridium. Also the platinum-tin-iridium catalyst calcined in the presence of a halogenating component has good yield stability for a longer period of time than the platinum-tin-iridium catalyst calcined without a halogenating component.

The results of reforming the naphtha at the above specified accelerated conditions, using Catalysts A, B, and C, are shown in FIGS. 1 and 2. The graphs in FIG. 1 show the average catalyst temperature as a function of on-stream time. The graphs in FIG. 2 show the $C_5+$ liquid yield in volume percent as a function of on-stream time. Catalyst B was also significantly better than Catalyst A in that it exhibited a lower fouling rate and good yield stability for a longer period of time. Catalyst C was even better in that the yield of $C_5+$ product obtained using catalyst C remained high over the entire run length of more than 80 hours and the fouling rate of Catalyst C was relatively very low.

EXAMPLE 2

Reforming processes using: (1) Catalyst C, (2) Catalyst D: a catalyst comprising 0.22 weight percent platinum, 0.05 weight percent iridium, and 0.6 weight percent chlorine on an alumina support and (3) Catalyst E: a catalyst comprising 0.3 weight percent platinum, 0.5 weight percent tin, and 1.1 weight percent chlorine on an alumina support, were compared. Catalysts D and E were used in reforming processes including the same naphtha feed and under the same reforming conditions as in Example 1.

The results of reforming with Catalysts D and E and with Catalyst C as well, can be seen in FIGS. 3 and 4. The graph in FIG. 3 shows that Catalyst C fouls at a significantly lower rate than Catalyst E, and, over the same period of time, 0–45 hours, at substantially the same rate as Catalyst D. The graph in FIG. 4 shows that Catalyst C exhibits good yield stability for a longer period of time than Catalyst D or Catalyst E.

While the invention has been described in connection with specific embodiments thereof, it will be understood that it is capable of further modification and this application is intended to cover any variations, uses, or adaptations of the invention, following, in general, the principles of the invention, and including such departures from the present disclosure as come within known or customary practice in the art to which the invention pertains, and as may be applied to the essential features hereinbefore set forth, and as fall within the scope of the invention and the limits of the appended claims.

The invention is hereby claimed as follows:

1. A process for reforming a naphtha feedstock, comprising:
   contacting a naphtha feedstock containing less than about 10 ppm by weight sulfur and less than about 50 ppm by weight water, hydrogen, and a catalytic composition including a porous solid carrier consisting essentially of alumina, 0.01 to 3 weight percent platinum, 0.01 to 5 weight percent tin, 0.001 to 1 weight percent iridium and 0.1 to 3 weight percent halogen at reforming conditions.

2. A process as in claim 1, wherein the platinum is from 0.1 to 1.0 weight percent, the tin is from 0.1 to 1.0 weight percent, and the iridium is from 0.01 to 0.3 weight percent.

3. A process as in claim 1, wherein the catalytic composition prior to the contacting is activated by the step comprising reacting the catalytic composition with an activating gas including oxygen and a halogenating component at a temperature from 500° to 1300°F. for at least about 0.5 hour.

4. A process as in claim 1, wherein the tin is included with the catalytic composition by impregnation from an organic solvent.

5. A process for reforming a naphtha feedstock comprising:
   contacting a substantially sulfur-free naphtha feedstock containing less than about 50 ppm. water, hydrogen, and a catalytic composition including a porous solid carrier consisting essentially of alumina, 0.01 to 2 weight percent platinum, 0.01 to 5 weight percent tin, 0.01 to 1 weight percent iridium and 0.1 to 3 weight percent halogen at reforming conditions.

* * * * *